(12) United States Patent
Venkatramani et al.

(10) Patent No.: US 12,506,333 B2
(45) Date of Patent: Dec. 23, 2025

(54) CIRCUIT BREAKER

(71) Applicant: Siemens Aktiengesellschaft, Munich (DE)

(72) Inventors: Anand Venkatramani, Fürth (DE); Gerald Plank, Fensterbach (DE)

(73) Assignee: Siemens Aktiengesellschaft, Munich (DE)

( * ) Notice: Subject to any disclaimer, the term of this patent is extended or adjusted under 35 U.S.C. 154(b) by 152 days.

(21) Appl. No.: 18/471,436

(22) Filed: Sep. 21, 2023

(65) Prior Publication Data

US 2024/0097428 A1 Mar. 21, 2024

(30) Foreign Application Priority Data

Sep. 21, 2022 (DE) .................... 10 2022 209 951.6

(51) Int. Cl.
*H02H 3/00* (2006.01)
*H02H 3/093* (2006.01)

(52) U.S. Cl.
CPC .................................. *H02H 3/093* (2013.01)

(58) Field of Classification Search
None
See application file for complete search history.

(56) References Cited

U.S. PATENT DOCUMENTS

| | | | |
|---|---|---|---|
| 3,526,812 A | 9/1970 | Steen et al. | |
| 7,420,355 B2 * | 9/2008 | Liu | H02M 3/158 361/18 |
| 9,966,754 B2 | 5/2018 | Franke et al. | |
| 9,991,079 B2 | 6/2018 | Franke et al. | |
| 10,199,195 B2 | 2/2019 | Borgwardt | |
| 10,209,280 B2 | 2/2019 | Borgwardt et al. | |
| 10,218,167 B2 | 2/2019 | Franke et al. | |
| 10,291,133 B2 * | 5/2019 | Yabuzaki | H02M 3/33523 |
| 10,680,428 B2 | 6/2020 | Geissler et al. | |
| 10,685,803 B2 | 6/2020 | Kupsch et al. | |
| 10,804,045 B2 | 10/2020 | Franke et al. | |
| 10,916,929 B2 | 2/2021 | Kopaczewski et al. | |
| 10,992,176 B2 | 4/2021 | Issani et al. | |
| 11,133,142 B2 | 9/2021 | Stehl | |
| 11,676,787 B2 | 6/2023 | Krauss et al. | |
| 2010/0284114 A1 * | 11/2010 | Kilroy | H02H 3/202 361/111 |

(Continued)

FOREIGN PATENT DOCUMENTS

| | | |
|---|---|---|
| DE | 102014209729 A1 | 12/2015 |
| DE | 102014217292 A1 | 3/2016 |

(Continued)

*Primary Examiner* — Stephen W Jackson
(74) *Attorney, Agent, or Firm* — Laurence A. Greenberg; Werner H. Stemer; Ralph E. Locher

(57) ABSTRACT

A circuit breaker for interrupting an electrical circuit when current limit values and/or current/time period limit values are exceeded has an energy transducer, the primary side of which is connected to the electrical circuit and the secondary side of which provides a power supply for at least one control unit of the circuit breaker. A first rectifier circuit and a second rectifier circuit are connected to the secondary-side output of the energy transducer. The first rectifier circuit is connected to the secondary-side output of the energy transducer via a capacitor.

13 Claims, 4 Drawing Sheets

(56) References Cited

U.S. PATENT DOCUMENTS

| | | | |
|---|---|---|---|
| 2014/0160820 A1* | 6/2014 | McKinley | H01F 38/32 363/126 |
| 2016/0063822 A1 | 3/2016 | Schwinn | |
| 2016/0064915 A1 | 3/2016 | Schwinn | |
| 2019/0038506 A1 | 2/2019 | Akerlund et al. | |

FOREIGN PATENT DOCUMENTS

| | | |
|---|---|---|
| DE | 102014217332 A1 | 3/2016 |
| DE | 102014218831 A1 | 3/2016 |
| DE | 102014218910 A1 | 3/2016 |
| DE | 102015217108 A1 | 3/2016 |
| DE | 102014224173 A1 | 6/2016 |
| DE | 102015216981 A1 | 6/2016 |
| DE | 102015226475 A1 | 11/2016 |
| DE | 102016201651 A1 | 11/2016 |
| DE | 102016202827 A1 | 11/2016 |
| DE | 102015210479 A1 | 12/2016 |
| DE | 102016201659 A1 | 12/2016 |
| DE | 102015216023 A1 | 2/2017 |
| DE | 102016205196 A1 | 10/2017 |
| DE | 102016217425 A1 | 3/2018 |
| DE | 102016221093 A1 | 4/2018 |
| DE | 102017201239 A1 | 7/2018 |
| DE | 102017205003 A1 | 9/2018 |
| DE | 102017205004 A1 | 9/2018 |
| DE | 102017211900 A1 | 1/2019 |
| DE | 102017212477 A1 | 1/2019 |
| DE | 102017214903 A1 | 2/2019 |
| DE | 102017214907 A1 | 2/2019 |
| DE | 102017215820 A1 | 3/2019 |
| DE | 102019213154 A1 | 3/2021 |
| WO | 9813917 A1 | 4/1998 |

* cited by examiner

CIRCUIT BREAKER

CROSS-REFERENCE TO RELATED APPLICATION

This application claims the priority, under 35 U.S.C. § 119, of German Patent Application DE 10 2022 209 951.6, filed Sep. 21, 2022; the prior application is herewith incorporated by reference in its entirety.

FIELD AND BACKGROUND OF THE INVENTION

The invention relates to a circuit breaker, namely, a circuit breaker for interrupting an AC electrical circuit when current and/or current/time period limit values are exceeded. The circuit breaker has an energy transducer, the primary side of which is connected to the electrical circuit and the secondary side of which provides a power supply for at least one control unit of the circuit breaker.

Circuit breakers are protective devices or protective switching devices that operate in a similar way to a fuse. Circuit breakers monitor the current flowing through them by way of a conductor and interrupt the electric current or flow of energy to an energy sink or a load—referred to as tripping—when protection parameters, such as current limit values or current/time period limit values, that is to say when a current value is present for a certain time period, are exceeded. The interruption is effected, for example, by contacts of the circuit breaker, which are opened.

Particularly for low-voltage electrical circuits or supply grids, there are various types of circuit breakers, depending on the level of the proposed electric current in the electrical circuit. Within the context of the invention, the term circuit breaker pertains, in particular, to switches that are used in low-voltage installations for currents between 63 and 6300 amperes. Molded case circuit breakers are especially used for currents between 63 and 1600 amperes, in particular from 125 to 630 or 1200 amperes. Air circuit breakers are used, in particular, for currents from 630 to 6300 amperes, especially from 1200 to 6300 amperes.

Air circuit breakers are identified by the acronym ACB and molded case circuit breakers are termed by the acronym MCCB for short.

Low voltage means, in particular, voltages up to 1000 volts AC or 1500 volts DC. Low voltage also means, in particular, voltages greater than extra-low voltage, with values of 50 volts AC or 120 volts DC.

Within the context of the invention, circuit breaker means, in particular, circuit breakers with a control unit such as an electronic trip unit, or ETU for short. The control unit monitors the level of the electric current measured by sensors such as Rogowski coils, or additionally, in an analog manner, of the voltage and/or other parameters of the electrical circuit, and causes the electrical circuit to be interrupted. Operation of the control unit requires electrical energy, which is provided by an energy transducer, such as a transformer. Said energy transducer has its primary side connected to the electrical circuit to be protected and its secondary side connected to the control unit.

When the flow of current is too "high," circuit breakers interrupt the circuit according to their protection parameters or response values. The protection parameters or response values are essentially the level of current and/or the level of current and the amount of time after which the circuit is meant to be interrupted if the flow of current is continuously "high." Unlike a fuse, these protection parameters or response values are adjustable for a circuit breaker, for example by means of the control unit, such as an electronic trip unit.

Circuit breakers according to the prior art are disclosed, for example, in the following German published patent applications: DE 10 2014 217 292 A1; DE 10 2014 217 332 A1; DE 10 2015 217 108 A1; DE 10 2014 218 831 A1; DE 10 2014 218 910 A1; DE 10 2016 201 651 A1; DE 10 2015 226 475 A1; DE 10 2015 216 981 A1; DE 10 2016 202 827 A1; DE 10 2016 201 659 A1; DE 10 2015 210 479 A1; DE 10 2014 224 173 A1; DE 10 2015 216 023 A1; DE 10 2016 217 425 A1; DE 10 2016 205 196 A1; DE 10 2016 221 093 A1; DE 10 2017 211 900 A1; DE 10 2017 201 239 A1; DE 10 2017 205 003 A1; DE 10 2017 205 004 A1; DE 10 2017 212 477 A1; DE 10 2017 214 903 A1; DE 10 2017 214 907 A1; and DE 10 2017 215 820 A1.

The energy transducers are used for the so-called internal power supply of circuit breakers. They are based on the principle of magnetically coupled power transmission, which provides power for the control unit, such as an electronic trip unit.

Often, a conductor in the electrical circuit forms the primary side of the energy transducer. This means, for example, that the electrical conductor is the primary coil of the energy transducer.

The problem with these transducers is high and low primary currents, which cause correspondingly high or low secondary currents (transformer principle). High primary currents can occur especially for high load currents or short-circuit currents.

The control unit requires a certain minimum amount of energy to operate. In order to provide this amount of energy, such an energy transducer requires a certain current (input current threshold) in the AC circuit. This means that the power requirement of the control unit determines the minimum required current in the AC circuit. This means that the circuit breaker can only provide protection (in accordance with its implemented functionalities) at or above this minimum required current (input current threshold).

Reducing the input current threshold at which the circuit breaker can provide protection is very important. The input current threshold (lowest current threshold) can be reduced by increasing the size of the energy transducer (current transformer). However, in the case of compact devices such as circuit breakers, this possibility is limited by the limited space.

On the other hand, the circuit breaker is still meant to function safely even when currents are high. In particular, there is the problem that energy transducers that already supply sufficient energy when currents are low deliver too much energy to the control unit when currents are higher, which can affect the functioning of said control unit.

The design of a power supply for control units of a circuit breaker is therefore not a trivial problem.

The apparent power of a current transformer increases linearly with the primary current amplitude and the line frequency. This results in a minimum primary current that is necessary to meet the secondary-side power requirement of the control unit or ETU. This minimum primary current (input current threshold) is determined by the requirements of the application, resulting in the magnetic dimensioning of the ferromagnetic core in the energy transducer or current transformer (especially the material selection and also magnetic core length and cross section). Essentially, a minimum magnetic cross section A is obtained for a magnetic operating point B, which is derived from a necessary secondary voltage U at the line frequency f.

Above the minimum primary current, the apparent power rises in a manner driven by the primary current amplitude. However, the power consumption of the control unit remains largely constant for all operating conditions, resulting in a problem. The excess power is converted into heat in the input voltage regulator and/or in the secondary winding. This heat must be dissipated; otherwise, a critical intrinsic heating occurs in the control unit and/or in the energy transducer.

SUMMARY OF THE INVENTION

The primary object of the present invention is to improve a circuit breaker of the type mentioned at the outset, in particular to provide a power supply that on the one hand supplies sufficient energy when currents in the AC circuit are low and on the other hand operates safely when currents in the AC circuit are high.

With the above and other objects in view there is provided, in accordance with the invention, a circuit breaker for interrupting an AC electrical circuit when current and/or current/time period limit values are exceeded. The circuit breaker comprises:
- an energy transducer having a primary side connected to the electrical circuit and a secondary side forming a power supply for a control unit (i.e., at least one control unit) of the circuit breaker;
- a first rectifier circuit and a second rectifier circuit connected to the secondary-side output of said energy transducer; and
- a capacitor connected between said first rectifier circuit and said secondary-side output of said energy transducer.

In other words, the above and other objects of the invention are solved by the provision of a first and a second rectifier circuit to be connected in parallel to the secondary-side output of the energy transducer. The first rectifier circuit is connected to the secondary-side output of the energy transducer via a capacitor. In particular, the second rectifier circuit is connected directly.

This has the particular advantage that the first rectifier circuit is optimally matched to the energy transducer by the capacitor and can thus supply sufficient energy for the control unit or loads of the circuit breaker when currents are low. When currents are high, the first rectifier circuit is no longer optimally matched by the capacitor, and so the energy delivered is low. Here, the second rectifier circuit undertakes the power supply. To this end, in particular the output sides of the rectifier circuits are advantageously connected in parallel (in order to provide the power supply for the at least one control unit of the circuit breaker).

In one advantageous embodiment of the invention, a conductor of the electrical circuit forms the primary side of the energy transducer.

This has the particular advantage that there is a simple design.

In one advantageous embodiment of the invention, the capacitor forms a series resonant circuit with the inductance of the secondary side of the energy transducer.

This has the particular advantage that there is maximum provision of energy and it is thus possible to achieve minimum possible currents in the AC circuit for a safe power supply.

In one advantageous embodiment of the invention, the capacitor is dimensioned such that its capacitive reactance for the operating frequency of the AC circuit corresponds identically to the inductive reactance of the inductance, wherein a value that occurs for currents in the AC circuit up to a first current level is set for the inductive reactance. This means that the capacitive reactance is cancelled out by the inductive reactance at the operating frequency (e.g. 50 Hz); the absolute values are the same.

This has the particular advantage that there is optimum or maximum provision of energy and it is thus possible to achieve minimum possible or defined currents in the AC circuit for a safe power supply.

In one advantageous embodiment of the invention, the capacitor or series resonant circuit is designed in such a way that for currents up to the first current level the energy delivered by the energy transducer is essentially delivered to the control unit via the first rectifier circuit.

In a further advantageous embodiment of the invention, for currents from the first current level upward the energy delivered by the energy transducer is essentially delivered to the control unit via the second rectifier circuit.

This has the particular advantage that there is an optimum power supply, both for low and for higher currents.

In one advantageous embodiment of the invention, an overvoltage protection element is connected in parallel with the secondary-side output of the energy transducer.

This has the particular advantage that voltage peaks for currents above normal operating situations are limited.

In one advantageous embodiment of the invention, the first or (and the) second rectifier circuit is a full-wave bridge rectifier circuit (also referred to as a Graetz bridge).

This has the particular advantage that there is particularly good rectification efficiency and problem-free parallel connection of the outputs.

These and other features which are considered as characteristic for the invention are set forth in the appended claims.

Although the invention is illustrated and described herein as embodied in circuit breaker, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
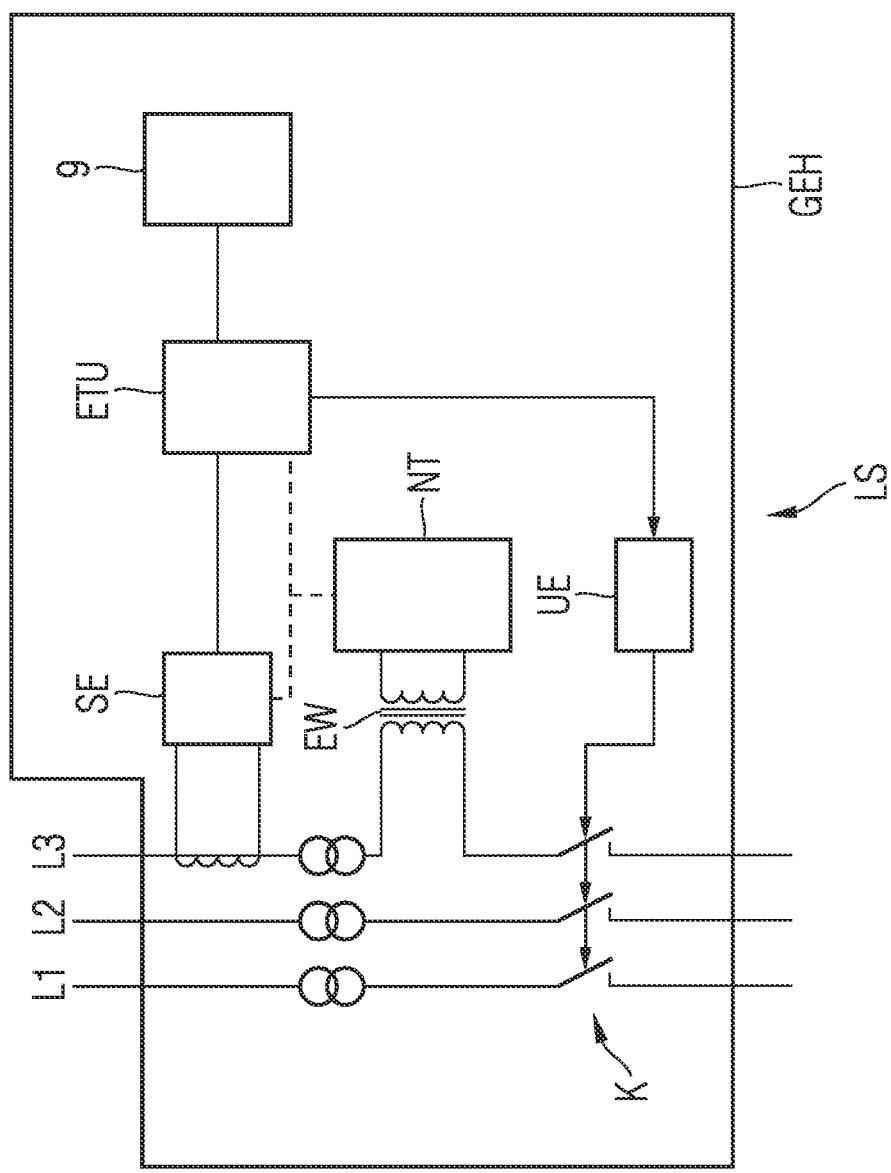
FIG. 1 shows a basic circuit diagram of a circuit breaker.

Referring now to the figures of the drawing in detail and first, in particular, to FIG. 1 thereof, there is shown a representation of a basic circuit diagram of an illustrative circuit breaker. The schematic shows a low-voltage circuit breaker LS. Various units of the circuit breaker are shown inside a housing GEH. FIG. 1 shows electrical conductors L1, L2, L3 of a low-voltage circuit, for example a three-phase AC circuit. The first conductor L1 forms a first phase, the second conductor L2 forms a second phase, and the third conductor L3 forms a third phase of the three-phase AC circuit. A neutral conductor and a protective conductor can also be provided.

In the example shown in FIG. 1, the third conductor L3 is connected to the energy transducer EW in such a way that at least a portion of the current, that is to say a partial conductor current, or the entire current of the third conductor flows through the primary side of the energy transducer EW. The energy transducer EW is usually a transformer with a core, for example an iron core transformer. In one embodiment, an energy transducer EW may be provided in each phase or in each conductor of the electrical circuit. The secondary side of the energy transducer EW or each provided energy transducer is connected to a power supply unit NT (or multiple power supply units) that provides a power supply—i.e., internal supply, for example in the form of a supply voltage, for the control unit ETU. The control unit, by way of example, is an electronic trip unit ETU. At least one additional component 9 may be connected to the control unit ETU. The power supply unit NT may also be connected to a first current sensor SE, to supply power to the first current sensor—if necessary.

The first current sensor SE has at least one sensor element, for example a Rogowski coil, a measuring resistor/shunt, a Hall sensor or the like, for ascertaining the level of the electric current of at least one conductor of the electrical circuit. In a common design variant, the level of the electric current of each phase conductor or conductor of the electrical circuit is ascertained.

The first current sensor SE is connected to the control unit ETU (electronic trip unit ETU) and transfers the level of the electric current of at least one conductor, the phase conductors or all conductors of the electrical circuit to said control unit. As mentioned previously, the control unit ETU can be a so-called electronic trip unit.

The transferred current values are compared in the control unit ETU with current limit values and/or current/time period limit values, which would represent reasons for tripping. If those limit values (i.e., thresholds) are exceeded, interruption of the electrical circuit is prompted. This can be accomplished, for example, by virtue of an interruption unit UE being provided, which firstly is connected to the control unit ETU and secondly has contacts K for interrupting the conductors L1, L2, L3 or further conductors of the electrical circuit. In this case, the interruption unit UE receives an interruption signal from the control unit ETU to open the contacts.

Figure 2:
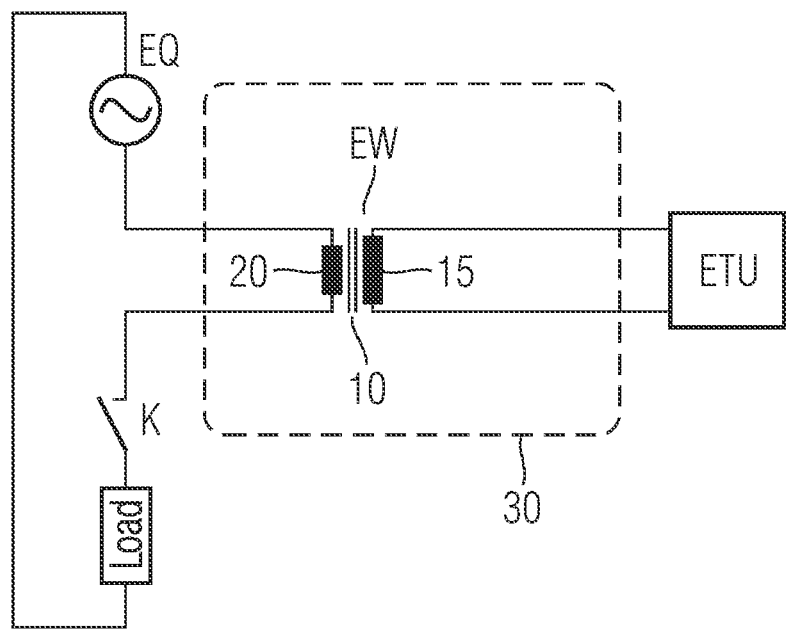
FIG. 2 shows a circuit diagram for explanation.

FIG. 2 shows a first circuit diagram to explain the invention. An AC power source EQ used as an energy source supplies power to a load Load used as an energy sink. A conductor of this circuit forms the primary side 20 of the energy transducer EW. The conductor can comprise multiple turns of a primary coil of the energy transducer EW. However, it is also possible for only the conductor (without a turn) to be passed through or by a core 10 of the energy transducer EW.

The core 10 of the energy transducer EW further comprises a secondary-side output or a secondary side with a secondary winding 15, which is formed by one or more turns of a secondary winding or coil 15.

The two connections of the secondary winding 15 form the secondary-side output of the energy transducer EW, which provides a power supply for the two inputs of the at least one control unit ETU. Further non-illustrated components of the power supply unit NT may be provided, which could be located in block 30, for example.

One output is electrically connected to one input.

Figure 3:
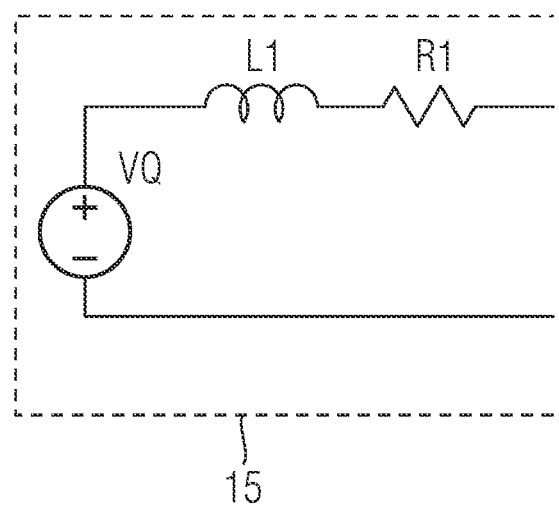
FIG. 3 shows an equivalent circuit diagram of a secondary winding.

FIG. 3 shows an equivalent circuit diagram of the secondary-side output or the secondary winding 15 of the energy transducer EW. The equivalent circuit diagram of the secondary winding 15 has a voltage source VQ (the voltage induced in the secondary winding) in series with an inductance L1 (the inductance of the secondary winding) and a resistor R1 (the wire resistance of the secondary winding).

Figure 4:
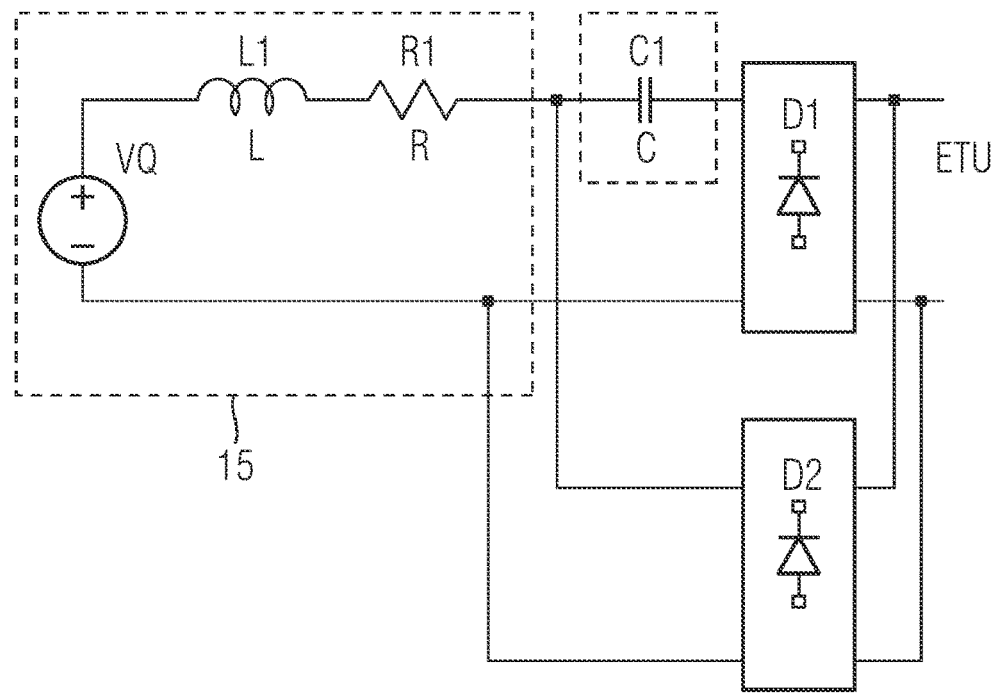
FIG. 4 shows a circuit diagram of an embodiment according to the invention.

FIG. 4 shows a representation based on FIG. 3, with the difference that a first and a second rectifier circuit D1, D2 are connected to the secondary-side output of the energy transducer EW or to the secondary winding 15 (represented by the equivalent circuit diagram).

The input sides of the rectifier circuits D1, D2 are connected in parallel. According to the invention, the first rectifier circuit D1 is connected to the secondary winding 15 via a capacitor C1. This means that, according to the invention, a capacitor or a capacitance is provided in at least one connection between the secondary winding 15 and the first rectifier circuit D1.

The second rectifier circuit D2 is connected directly to the secondary winding 15.

The output sides of the first and second rectifier circuits D1, D2, i.e. the rectifier circuits, are connected in parallel in order to provide a power supply for the at least one control unit ETU of the circuit breaker LS.

The capacitor C1 advantageously forms a series resonant circuit with the inductance L1 of the secondary winding 15 of the energy transducer EW. The capacitor C1 is advantageously dimensioned such that its capacitive reactance $$XC=1/\omega C$$

($\omega=2*Pi*f$=angular frequency)
(C=capacitance of the capacitance C1)
(XC=capacitive reactance)
for the operating frequency of the AC circuit corresponds identically to the inductive reactance (XL) of the inductance L1, i.e., the absolute value of the inductive reactance corresponds to the absolute value of the capacitive reactance (|XL|=|XC|). This cancels out the reactive components at the rated frequency (which should correspond to the operating frequency of the AC circuit, e.g. 50 Hz).

($XL=\omega L$=inductive reactance)
(L=inductance of the inductance L1)

For example, a value that occurs for currents up to a first current level is set for the inductive reactance XL.

This is explained again below in association with further additions and in other words. The control unit ETU is supplied with power by energy transducers (current transformers) placed in the circuit breaker LS. These energy transducers EW have, e.g., a torodial design with a complete flow path formed by, e.g., the core 10 containing iron material (iron core 10). The primary conductor of the primary side 20 is routed by, e.g., a core 10 in the form of a ring (toroid). The electromagnetic energy generated by the primary conductor is captured by the iron core 10. The secondary windings 15 wound around the iron core 10 convert the electromagnetic energy into electrical energy (voltage source VQ).

Depending on the level of the current on the primary side 20, the energy transducer has a different behavior:

When currents are low, up to a first current level, the energy transducer EW operates in an essentially linear manner.

When currents are high, from a first current level upward, the energy transducer EW operates in an essentially nonlinear manner.

This dual behavior is due to the core 10, embodied as an iron core, which is used for transmitting the electromagnetic energy.

Figure 5:
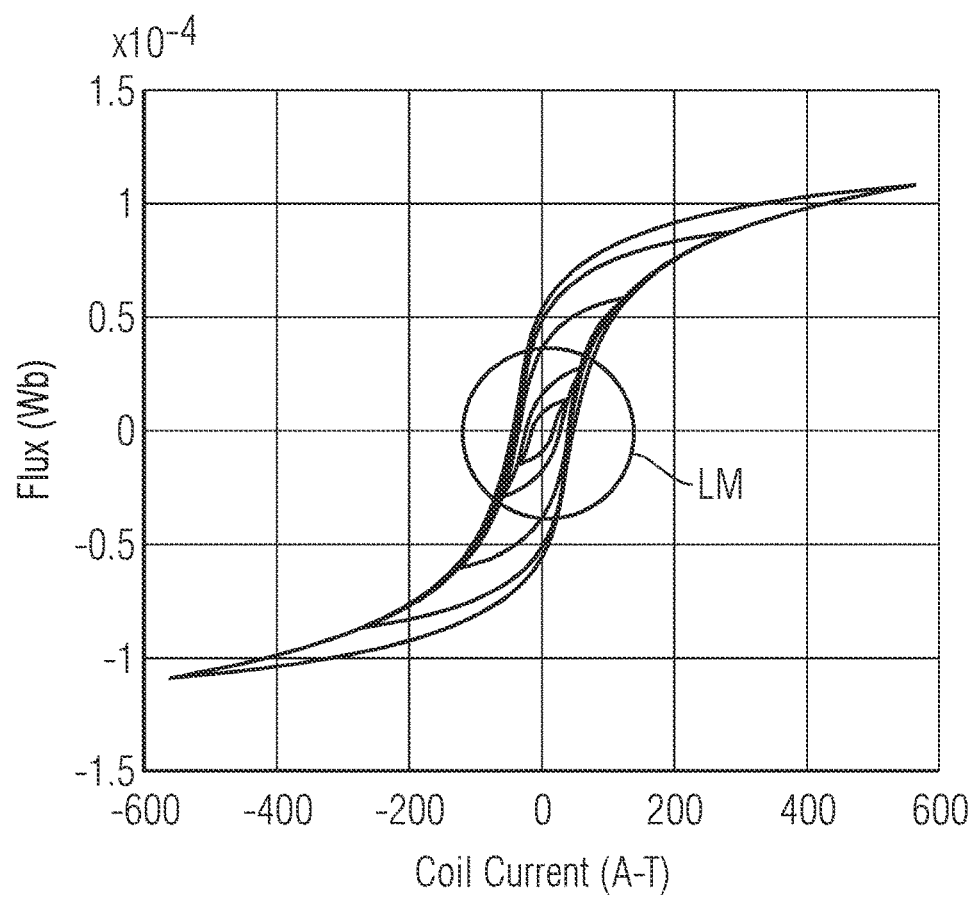
FIG. 5 shows a graph of a B-H curve.

The property of the iron core is characterized by a so-called curve B-H curve, as shown in FIG. 5. FIG. 5 shows a B-H curve. Said curve shows the amount of flux Flux (Wb), on the vertical axis, that is produced by the iron core in response to the input line current Coil Current (A-T), on the horizontal axis.

When line currents Coil Current are low (low H), the curve is approximately linear, as shown as the linear range LM (circle) in the graph.

In this operating range up to a first current level, the energy transducer EW behaves like a current-dependent voltage source VQ with a series inductance L1, as shown in the equivalent circuit diagram (and with a resistance component of the resistor R1).

When input currents are higher, the energy transducer EQ deviates from this model and behaves like a nonlinear voltage source VQ. According to the invention, the linearity of energy transducers EW is used when line currents are low (up to a first current level). Here, more energy is extracted using a capacitor that forms a series resonant circuit, i.e., using resonance, when line currents are lower (resonance capacitor C1 connected in series).

When line currents (on the primary side 10) are lower, the capacitance of the capacitor C1 cancels out the inductance L1 (of the secondary winding 15). This contributes to the circumstance that, according to the equivalent circuit diagram, the voltage source VQ of the secondary winding 15 directly supplies the first rectifier circuit D1 with energy, i.e., an adjustment (reduced source impedance) is achieved in order to extract a higher power for the control unit in this way. The energy flows to the first rectifier circuit D1.

When line currents are higher, from a first current level upward, when the energy transducer EW is not operating in a linear manner, the capacitor C1 cannot compensate for the inductance L1 due to its change in value. The energy is then drawn by means of the second rectifier circuit D2.

In summary, the source impedance Z:

$Z=R1$ when line currents are low ($|XL|=|XC|$)

$Z=\sqrt{(XL1)^2+(R1)^2}$ when line currents are higher

The source impedance Z is reduced when line currents are low, and a higher power can be drawn from the energy transducer EW. This means that energy can be provided for a control unit ETU even when currents on the primary side 20 are low.

Figure 6:
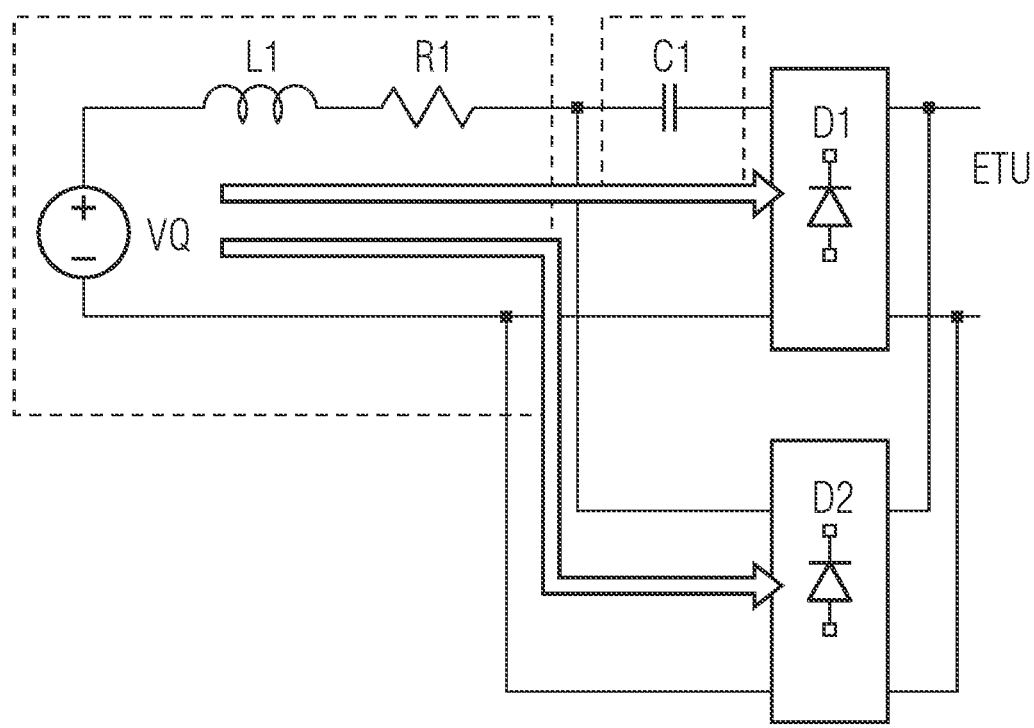
FIG. 6 shows a further circuit diagram for supporting a description of the invention.

FIG. 6 shows a representation based on FIG. 4, with the flow of energy shown according to the invention.

The capacitor C1 or the series resonant circuit comprising the series circuit containing the capacitor C1 and the inductance L1 are designed in such a way that for currents up to a first current level the energy delivered by the energy transducer EW is essentially delivered to the control unit ETU via the first rectifier circuit D1.

For currents from the first current level upward the energy delivered by the energy transducer EW is essentially delivered to the control unit ETU via the second rectifier circuit D2.

An overvoltage protection element can be connected in parallel with the secondary-side output or secondary winding 15 of the energy transducer EW.

The first or (and the) second rectifier circuit can be a full-wave bridge rectifier circuit.

The core 10 can be a nanocrystalline magnetic core, for example to reduce current harmonics.

Further components/components of the power supply unit NT may be provided.

The invention uses the linearity of energy transducers when currents are low to increase the power supplied by a capacitor. There is a dynamic change in the energy flow path with two rectifier circuits, one for resonance and one without resonance, without (significantly) increasing the complexity of the system. The invention thus reduces current required on the primary side in order to provide energy (e.g., for a control unit). Two rectifier circuits connected in parallel eliminate the need for complicated switching mechanisms.

Although the invention has been described and illustrated in more detail by way of the exemplary embodiment, the invention is not restricted by the disclosed examples and other variations may be derived therefrom by a person skilled in the art without departing from the scope of protection of the invention.

The invention claimed is:

1. A circuit breaker for interrupting an AC electrical circuit when current and/or current/time period limit values are exceeded, the circuit breaker comprising:
   an energy transducer having a primary side connected to the electrical circuit and a secondary side forming a power supply for a control unit of the circuit breaker;
   a first rectifier circuit and a second rectifier circuit connected to the secondary-side output of said energy transducer;
   a capacitor connected between said first rectifier circuit and said secondary-side output of said energy transducer; and
   said capacitor being connected to form a series resonant circuit with an inductance of a secondary winding of said energy transducer, and said capacitor being dimensioned to have a capacitive reactance at an operating frequency of the AC electrical circuit that corresponds identically to an inductive reactance of said inductance.

2. The circuit breaker according to claim 1, wherein said primary side of said energy transducer is formed by a conductor of the electrical circuit.

3. The circuit breaker according to claim 1, wherein output sides of said first and second rectifier circuits are connected in parallel to provide a power supply for said control unit of the circuit breaker.

4. The circuit breaker according to claim 1, wherein a value for the inductive reactance is set to a value that occurs for currents up to a first current level.

5. The circuit breaker according to claim 1, which further comprises an overvoltage protection element connected in parallel with said secondary-side output of said energy transducer.

6. The circuit breaker according to claim 1, wherein one of said first or second rectifier circuit is a full-wave bridge rectifier circuit.

7. A circuit breaker for interrupting an AC electrical circuit when current and/or current/time period limit values are exceeded, the circuit breaker comprising:
   an energy transducer having a primary side connected to the electrical circuit and a secondary side forming a power supply for a control unit of the circuit breaker;
   a first rectifier circuit and a second rectifier circuit connected to the secondary-side output of said energy transducer;
   a capacitor connected between said first rectifier circuit and said secondary-side output of said energy transducer; and said capacitor being connected to form a series resonant circuit with an inductance of a secondary winding of said energy transducer, and said series resonant circuit with said capacitor being configured such that, for currents up to a first current level, the energy delivered by said energy transducer is primarily delivered to said control unit via said first rectifier circuit.

8. The circuit breaker according to claim 7, wherein, for currents upward of the first current level, the energy delivered by said energy transducer is primarily delivered to said control unit via said second rectifier circuit.

9. The circuit breaker according to claim 7, wherein said primary side of said energy transducer is formed by a conductor of the electrical circuit.

10. The circuit breaker according to claim 7, wherein output sides of said first and second rectifier circuits are connected in parallel to provide a power supply for said control unit of the circuit breaker.

11. The circuit breaker according to claim 7, wherein a value for the inductive reactance is set to a value that occurs for currents up to a first current level.

12. The circuit breaker according to claim 7, which further comprises an overvoltage protection element connected in parallel with said secondary-side output of said energy transducer.

13. The circuit breaker according to claim 7, wherein one of said first or second rectifier circuit is a full-wave bridge rectifier circuit.

* * * * *